United States Patent
Dolfsma

[11] 3,919,860
[45] Nov. 18, 1975

[54] FLEXIBLE COUPLING
[75] Inventor: H. Dolfsma, Jutphaas, Netherlands
[73] Assignee: SKF Industrial Trading and Development Company B.V., Jutphaas, Netherlands
[22] Filed: Sept. 24, 1973
[21] Appl. No.: 400,283

[30] Foreign Application Priority Data
Oct. 4, 1972 Netherlands .................... 7213389

[52] U.S. Cl. .................... 64/14; 64/11 R; 64/27 R
[51] Int. Cl. ............................................ F16d 3/64
[58] Field of Search .......... 64/14, 27 NM, 27 R, 13, 64/11 R, 9

[56] References Cited
UNITED STATES PATENTS

| | | | |
|---|---|---|---|
| 2,121,066 | 6/1938 | Anderson et al. | 64/14 |
| 2,873,590 | 2/1959 | Croset | 64/14 |
| 2,921,449 | 1/1960 | Jackel | 64/11 |
| 3,345,831 | 10/1967 | Boole | 64/14 |
| 3,713,306 | 1/1973 | Burdelski | 64/27 NM |

FOREIGN PATENTS OR APPLICATIONS
1,208,566   1/1966   Germany .................... 64/27 NM Primary Examiner—Samuel Scott
Assistant Examiner—Randall Heald
Attorney, Agent, or Firm—Daniel M. Rosen

[57] ABSTRACT

Flexible coupling with two coupling halves comprising elements transmitting power, which elements can be coupled by means of resilient members which are fixed in one of the coupling halves and at least one coupling element provided with apertures for securing the resilient members is coaxially connected with another coupling element, characterized in that a coupling element is ring-strip or band-shaped and comprises apertures which are suitable for radially accomodating the resilient members and which are provided with power transmitting edge portions.

17 Claims, 20 Drawing Figures

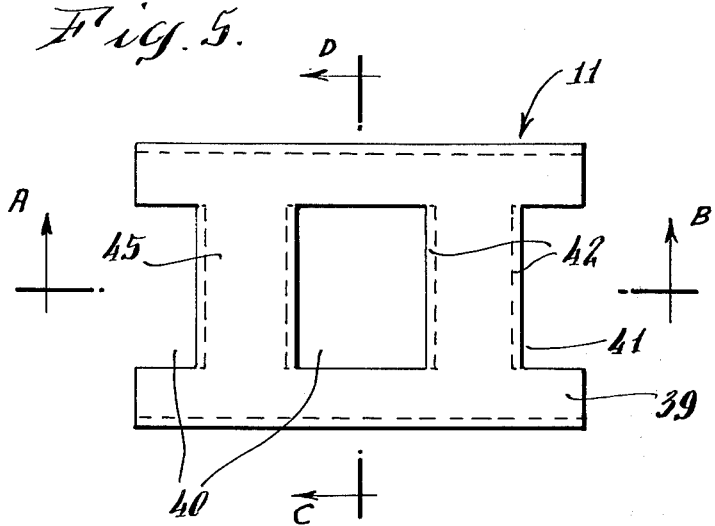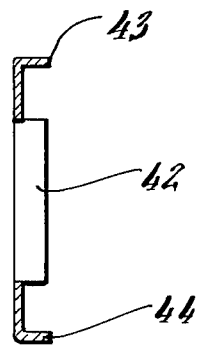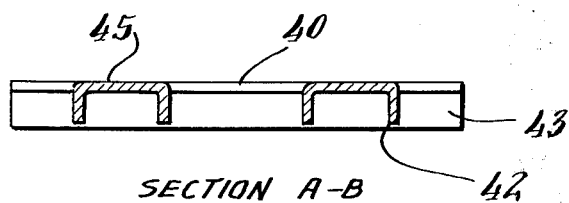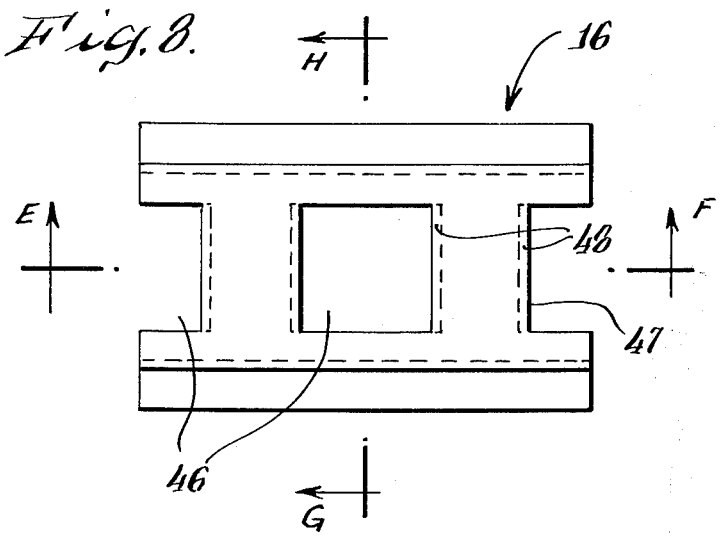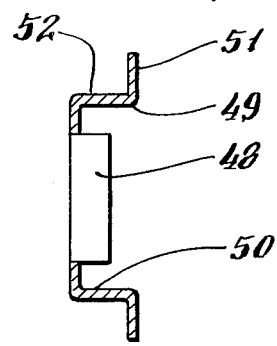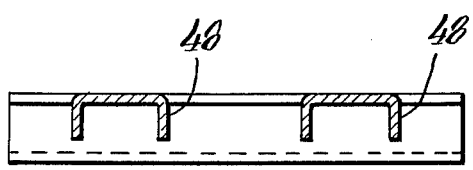

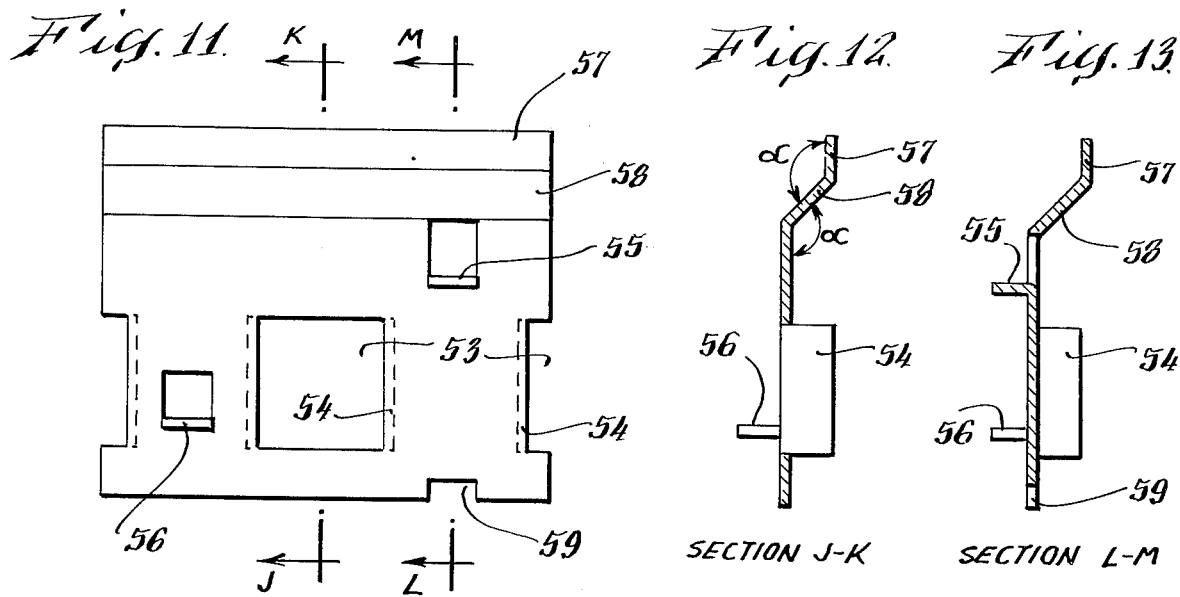
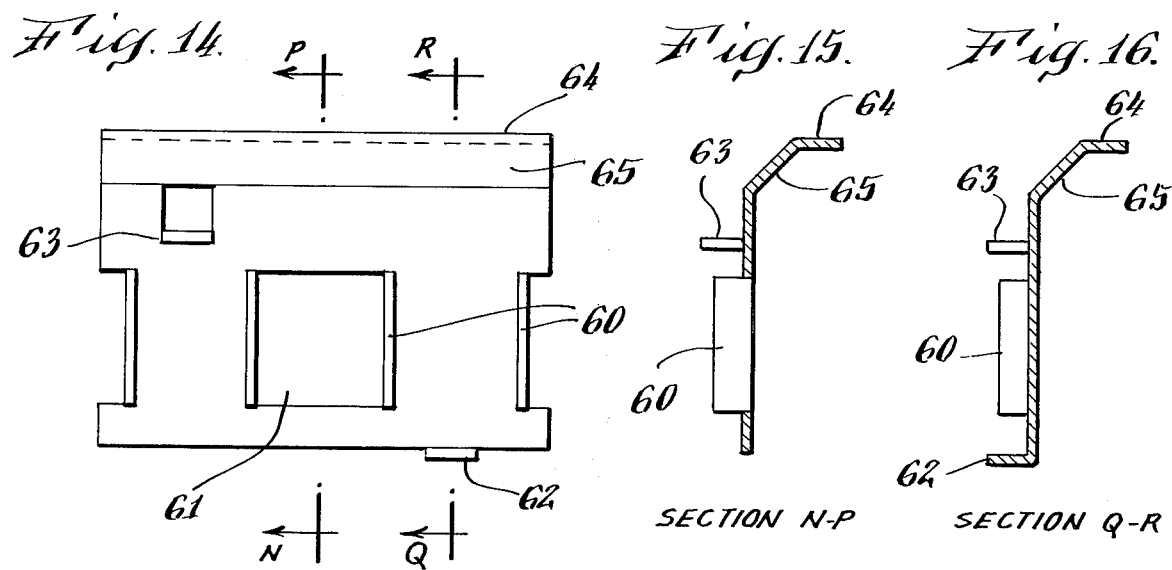
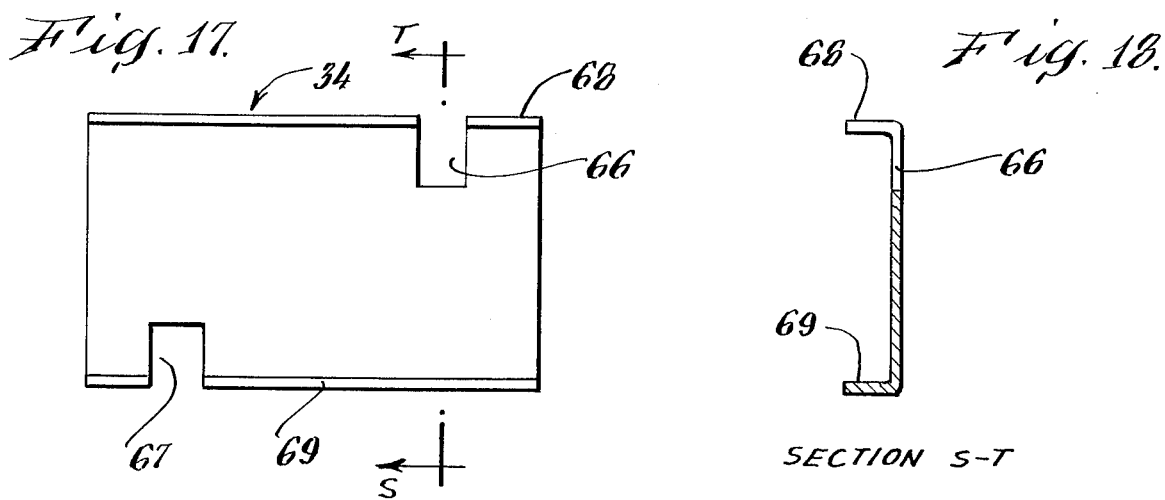

FLEXIBLE COUPLING

The invention relates to a flexible coupling with two coupling halves comprising coupling elements transmitting power which elements can be coupled by means of resilient members being fixed in one of the coupling halves. At least one coupling element, provided with apertures for securing the resilient members is co-axially connected to another coupling element. One expanded of such a flexible coupling of this type is described in the Dutch Pat. No. 50428.

The present invention aims however at improving a coupling of the said type, especially regarding the manufacturing as well as the mounting and dismounting purposes. To that end a coupling element is ring-strip — or band-shaped and comprises apertures which are suitable for radially accomodating the resilient members and which are provided with power transmitting edge portions. In this way a coupling is obtained, which, while meeting the requirement that each couple has to be transmitted optimally even under variable loads, takes up a minimum volume due to a very small radial dimension and displays a relatively low weight. Also the mounting and dismounting of the coupling, such as the alignment thereof or the exchange of the resilient elements, is simple and presents few problems. Manufacturing of a flexible coupling at issue now can be advantageously realized by applying the combination of sheet-steel and the special forms of the coupling elements.

The invention will be described in detail by reference, to various embodiments emphasising advantages and features thereof:

FIG. 5 shows a top view of a coupling element;

FIGS. 6 and 7 represent sectional views of the coupling element as shown in FIG. 5, in the direction of the arrows A–B and C–D, respectively;

FIG. 8 shows a top view of another coupling element;

FIGS. 9 and 10 represent cross sectional views according to arrows E–F and G–H, respectively of the coupling element shown in FIG. 8;

FIG. 11 shows a top view of an embodiment of a coupling element according to the invention;

FIGS. 12 and 13 represent cross sectional views according to the arrows J–K and L–M, respectively of the element shown in FIG. 11;

FIG. 14 shows the top view of another embodiment of a coupling element according to the invention;

FIGS. 15 and 16 represent cross sectional views according to the arrows N–P and Q–R, respectively of the element shown in FIG. 14;

FIG. 17 shows an embodiment of a closing band applied to a coupling according to the invention;

FIG. 18 shows a cross sectional view according to arrows S–T of the closing band according to FIG. 17;

Figure 1:
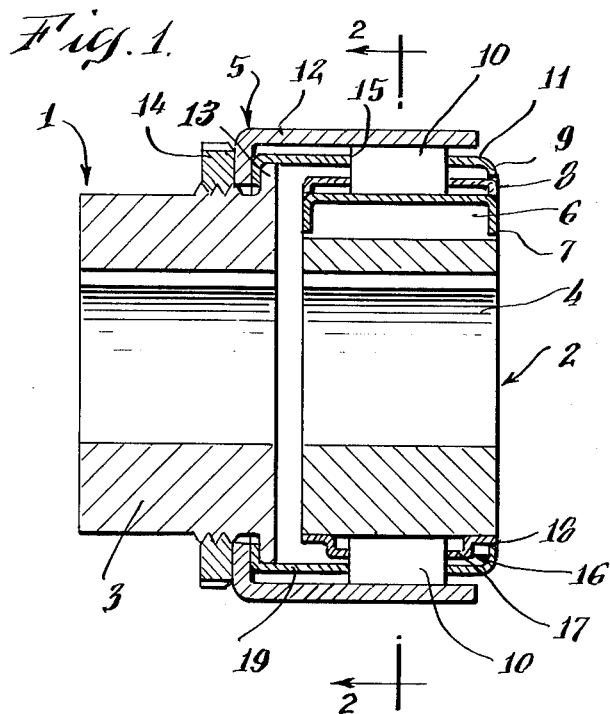
FIG. 1 represents a coupling according to the invention, wherein, in order to reduce the number of figures, two embodiments of the coupling elements are shown in the lower and upper part resp. of the figure.

According to FIG. 1 the flexible coupling comprises two coupling halves 1 and 2, provided with coupling discs 3 and 4, respectively, on to which are fastened composite coupling elements 5 and 6, respectively.

The coupling element 6 comprises a sleeve 7, arranged around the disc 4, while a plate-shaped coupling element 8 is fastened, for example by welding, to the sleeve 7 as shown. The coupling element 8 is provided with apertures 9, for receiving, in accordance with the invention, a resilient member 10, for example a cylindrical rubber plug, in a radial direction while at the same time being able to support it, tangentially or in the direction of rotation in an optimum manner. Part II of the second coupling element 5 is arranged coaxially with the plate or band-shaped element 8, the said element part being fastened by means of a closing member 12 to a flange 13 of the coupling disc 1. The closing member of this embodiment is fixed on the coupling half 1 by means of a lock nut 14. Part II also displays an aperture 15 for radially receiving a resilient member 10 according to the invention and for supporting it, transmitting power in the direction of rotation. The member 10 is enclosed from outside by the closing element 12, keeping the said members (10) in position.

The lower part of FIG. 1 shows the schematic diagram of a modified embodiment of a coupling element 16, which, in contrast to the coupling element 6, is in a direct connection with the disc 2 and which also displays a bent part 17 in the proximity of the resilient member 10, such arrangement imparting considerable rigidity to the coupling element. It is advantageous to fasten a rather wide part of the edge 18 of element 16 by a permanent connection, for example by welding, to the disc 2.

Figure 2:
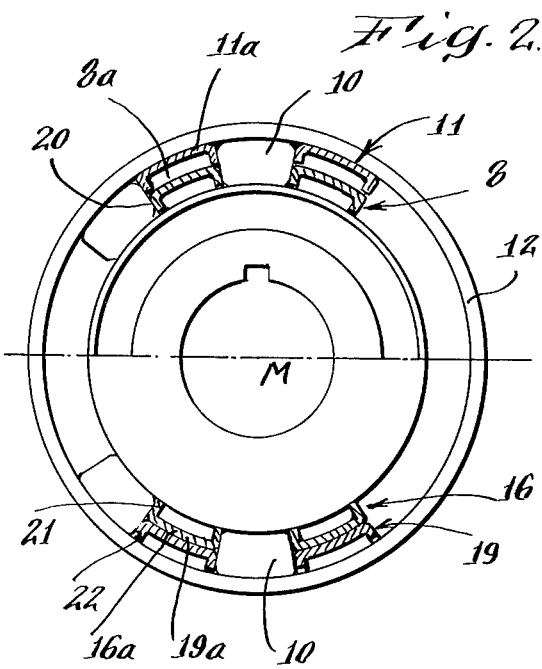
FIG. 2 represents a sectional view according to the line II — II of FIG. 1.

FIG. 2 is a cross section through the line II — II, representing the mutual relationship between the resilient members 10 on the one hand, and that of the coupling elements 8 and 11, with the coupling element 16 and 19 on the other hand. The resilient members 10 are thus supported, according to the invention, tangentially or in the direction of rotation of the coupling, by upset edge portions 20, 21 and 22 of the coupling elements 8, 11 and 16, 19 in powertransmitting relationship. In this preferred embodiment the edge portions 20, 21 and 22, forming supporting or pressure planes, are essentially radially arranged. The edge portions 20, 21 and 22 are preferably formed by bending over material from the apertures 8 and 15, respectively, the angle between the said upset edges and the middle part or body 8a, 11a and 16a of the coupling element being smaller than 90°. According to the invention the planes 20, 21 and 22 display a form ensuring maximum contact between the said planes and the resilient members 10, which is important particularly in constructions subject to high accelerations. The upset edge portions 20, 21 of the coupling elements 8, 11 and 16 are directed radially inwards (towards the center M). The lower part of FIG. 2 shows another embodiment, wherein the upset pressure planes of the coupling element 16 are directed inwards, whereas the planes 22 of the coupling element 19 are arranged radially outwards. The middle parts 16a and 19a of the said coupling elements are arranged in the close proximity of one another, ensuring optimum couple transmission.

Figure 3:
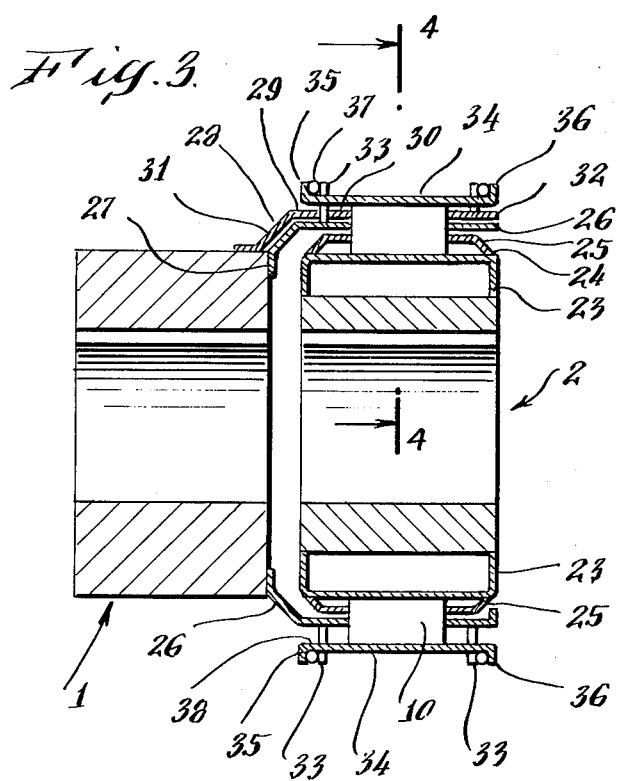
FIG. 3 represents another embodiment of a coupling according to the invention, wherein in order to reduce the number of figures, two different embodiments of coupling elements are shown in the lower and upper parts of the figure.

FIG. 3 represents an embodiment of a flexible coupling according to the invention, characterised by increased rigidity, while maintaining the required flexibility and displaying, in proportion to the various values of the couples to be transmitted, a very low weight. For this purpose, the coupling is provided with a sleeve 23, which fits to the disc 2, a coupling element 24 being mounted on the said sleeve. It has to be pointed out, that corresponding parts will be indicated by the same numbers as in FIGS. 1 and 2. In the favourable embodiment of FIG. 3 the coupling element 24 comprises a bent part 25, arranged in the proximity of the resilient member 10, the bending angle in this case being over 90° however. Thereby the rigidity of the element is increased considerably. A second coupling element 26 is mounted coaxially with the coupling element 24, the coupling element 26 being fastened to the coupling disc 1 by an end portion 27. In this favourable embodiment the coupling element 26 also displays a bent part 28, the bend 29 being arranged as near the aperture 30 as possible. According to the view of a coupling shown in the upper part of FIG. 3, a third coupling element 31 is arranged coaxially with both coupling halves 24 and 26, the said third coupling element being fastened — in this preferred embodiment — at one side through a detachable connection with a bent edge portion 32 of the coupling element 26. In this manner a rigid, lightweight and at the same time flexible coupling is obtained. In a preferred embodiment of the coupling element 31 a fixing lip 33 is provided thereon, which is introduced into an aperture of a closing band 34, fitting around the resilient members. The band 34 is provided with upset edge portions 35 and 36. Between each edge-portion 35, 36 and the lips 33 a closing or clamping ring 37 is mounted. In this favourable embodiment the positioning of the power transmitting elements is optimally affected by the shape or type of the clamping and closing ring 37.

The lower part of FIG. 3 represents an embodiment of a coupling, not comprising the third coupling element 31 and wherein the fixing of the closing band 34 — again by means of a closing lip introduced into the aperture 36 of the said band 34 — is effected directly on the coupling element 26.

Figure 4:
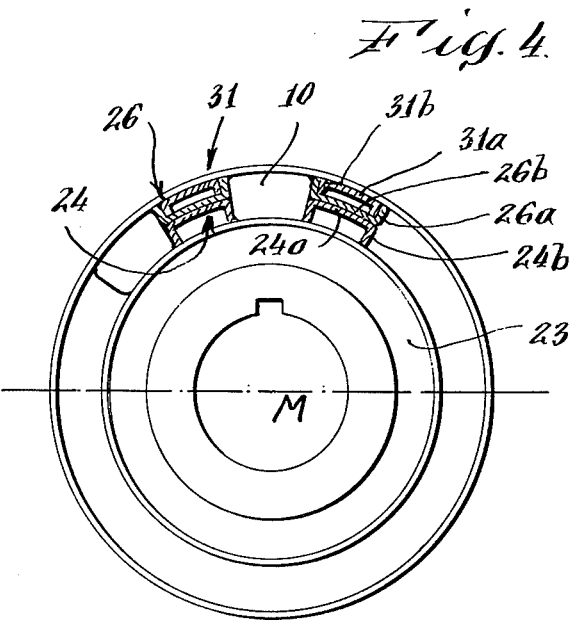
FIG. 4 shows a sectional view according to line IV — IV of FIG. 3.

The view in FIG. 4 represents particularly the mutual relationship between the coupling elements 24, 26 and 31 on the one hand and the resilient coupling members 10 on the other hand, through application of a third coupling element 31, a coupling being produced, which in spite of its low weight displays in conjunction with the required flexibility a considerable rigidity, in this way ensuring optimum couple transmission under varying operational conditions. This effect is emphasized by the upset edge-portion 26a of the aperture 30 of element 26 being supported by the upset edge-portion 31a of the aperture of element 31, while middle portions 24a and 26b of elements 24 and 26 are arranged as close to one another as possible. A favourable reinforcing of the coupling elements can be ensured by providing a material, for example a welding bead in the corners of the upset edge-portions 24b and the middle portions 24a.

FIG. 5 represents the top view of coupling elements 11 and 19, respectively as applied to the flexible coupling of FIG. 1. It is preferable to produce the coupling element of high-grade sheet steel, formed into a band 39 wherein the apertures 40 are made. The apertures 40 are produced for example by punching or a similar perforating procedure, the portions 42 being formed on the edges 41 through upsetting. The portions 42 lean against the members 10 (see FIGS. 1-4), thereby forming power-transmitting planes (see also FIGS. 6 and 7). Another advantage of such a design is that the upset edge portions 42 obtain through punching or a similar perforating procedure a form which ensures an optimum fitting surface for the resilient member 10. In order to increase the rigidity of the plate-shaped band 39, the edges 43 and 44 (FIG. 7) are upset.

In this favourable embodiment the edge 44 at the same time forms a fixing element to which the said edge (see FIG. 1) is fixed, between the flange 13 and the closing member 12, by means of the nut 14 on the coupling disc 1. Between the apertures barriers 45 are arranged, indicated heretofore as middle parts, e.g. 8A and 11A (FIG. 1) and which are provided with (non-represented) grooves or ribs for increasing the rigidity of the element.

FIG. 8 represents the view of a coupling element as shown in FIG. 1 (in the lower part thereof). The coupling element 16 is also in this case made of high-grade sheet material, wherein apertures 46 are provided and wherein the edges 47 display upset portions 48 (see also FIGS. 9 and 10). According to the view of FIG. 10 the coupling element 16 (see also FIG. 1) is bent symmetrically (section G–H), thereby ensuring optimum transmission of loads. At either side of the plane 48 two bends 49 and 50 are formed in the coupling element, the bending angle being about 90°. In this way the bent portions 51 and 52 are identical. In a preferred embodiment the portion 51 is nearly completely fixed to the coupling disc 2 (see FIG. 1) through a permanent connection, e.g. welding, thereby increasing the rigidity of the lightweight construction.

FIG. 11 represents the top view of a coupling element 31 as applied to the coupling according to FIG. 3. Such coupling element is particularly suitable for imparting increased rigidity and strength to the coupling, while maintaining its flexibility. In addition, such a favourable embodiment comprises special means for the mutual linking of the coupling elements. According to FIG. 11 in the band-shaped element 31 apertures 53 are provided, with upset edge portions 54 made in the indicated manner. Thereby the element 31 comprises lips 55 and 56 for fixation of this element to another. The lips 33 in FIG. 3 are identical to fixing lips 55 and 56 in FIG. 11. These fixing lips fit into the apertures 38 of the closing element 34 connected to the element 31 (see FIG. 3). The fixing lips 33 form in conjunction with the upset edges 35 and 36 (see FIG. 3) and the closing band 37 the closing device of the coupling. The cross section in FIGS. 12 and 13 also represent the bent shape of a coupling element according to FIG. 11. In this case the bending angles are larger than 90° and the bent portions 57 and 58 have approximately the same size. Furthermore the coupling element displays a recess 59, forming a part of the fixation of this element to the second coupling element 26, being coaxially connected therewith (see FIGS. 3 and 14).

FIG. 14 represents a top view of a coupling element 26 as shown herebefore in the lower part of FIG. 3. In addition to the apertures 61, provided with supporting planes 60, the said coupling element comprises a fixing lip 62 and a lip 63, produced by punching a sheet material. The said lips fit into the recesses 38 (lower part of FIG. 3) of the closing member 34. According to FIG. 15 the coupling element 26 is also provided with bent portions 64 and 65, with bending angles larger than 90°. Such design contributes to the flexibility of the coupling, while the welding of the relatively long portion 64 to the coupling disc 1 ensures optimum rigidity.

FIG. 17 represents the top view of a closing member 34 as applied to the coupling according to FIG. 3. Such closing member is also made of highgrade sheet material and forms a flexible band closing the external side of the resilient coupling members 10, thereby stabilising the position of the said members at least in radial direction. For this purpose the closing plate is provided with recesses 66 and 67, arranged at either side of the band-shaped closing member. In this arrangement the fixing lips 63 or the lips 55 and 56 (FIG. 11.) fit into the recesses 66 and 67, respectively (see FIG. 3 as well). Between the lips and the upset edge portions 68 and 69, respectively of the closing band 34 a locking washer 37 is arranged, ensuring within certain limits the positioning — axial and radial displacement — of the members 10.

Figure 19:
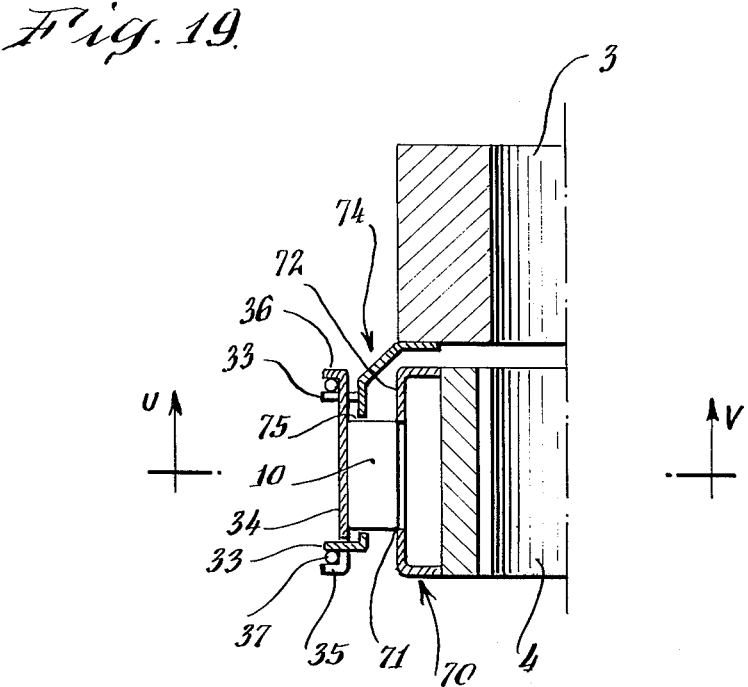
FIG. 19 shows another embodiment of a flexible coupling according to the invention.
Figure 20:
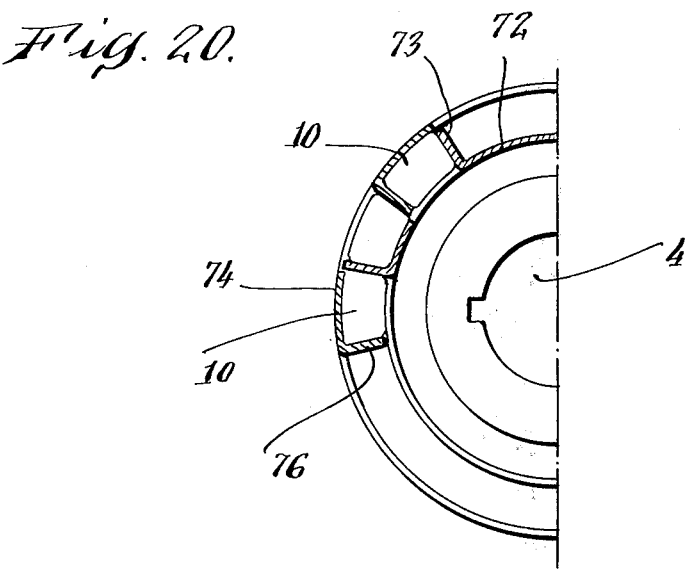
FIG. 20 shows a view of a part of the coupling shown in FIG. 19 in the direction of the arrows U–V.

FIG. 19 represents a part of a flexible coupling wherein the coupling elements can transfer pressure forces onto the resilient elements 10 only, thereby eliminating shearing loads. For this purpose the coupling disc is provided with a sleeve of sheet steel, the said sleeve being also supplied with apertures 71 for fixing the resilient elements 10, the part of the sleeve contacting the disc 4. The upset edge 73 (see FIG. 20) extends over the entire thickness or height of the resilient element 10. On account of this the element 10 can be loaded by pressure only, which considerably prolongs the service life of the coupling. The coupling element 74 is mounted on the disc 3, the said element being in connection with the upper side of the resilient elements 10. In the coupling element apertures 75 are provided as well, for receiving the elements 10.

Edge parts 76, which are upset, extend from the upper side of the element radially inwards (see FIG. 20), which, consequently can take up and transfer pressure loads only. The element 74 is provided with fixing lips 33 as well (as described earlier, see FIG. 3), the said lips effecting in conjunction with upset edge parts 35 and 36 of the closing ring 34 and the closing ring 37, the closing and positioning of the resilient elements.

Thus, the invention provides a flexible coupling, which displays, due to certain specific constructional details, an extremely light weight in comparison with couplings of the same capacity, having at the same time minimum dimensions, at least in radial direction. It should be pointed out further that the invention is not limited by the described embodiments; constructions of the coupling elements, executed in the form of rings or cages lay within the idea of the invention as well.

I claim:

1. In a flexible coupling of a type having two coupling halves comprising coupling elements for transmitting power by way of resilient members fixed between the coupling halves, and wherein each coupling element has radially extending portions between which the resilient members are positioned; the improvement wherein each said coupling element comprises a band-shaped member having apertures extending radially thereto for receiving said resilient members, said band-shaped members having radially extending edges at said apertures engaging the sides of said resilient members in the power transmitting direction, whereby said resilient members are tightly fitted between said radially extending edges when loaded in both power transmitting directions of said coupling.

2. The flexible coupling of claim 1 wherein said radially extending edges comprise upset edges formed by material forced out of said apertures, upset edges of the two coupling elements being aligned and together forming power transmitting planes.

3. Flexible coupling according to claim 1, characterized in that an aperture edge with thickening forms a power transmitting plane for the resilient member, said plane being at least essentially axially directed and primarily radially arranged with respect to the cross-section of a coupling element.

4. The flexible coupling of claim 1, characterized in that an aperture edge provided with an upset plate section forms a power transmitting plane for the resilient member, said plane being at least essentially axially directed and primarily radially arranged with respect to the cross-section of a coupling element.

5. Flexible coupling according to claim 1, characterized in that with respect to the cross section, the power transmitting plane of two coupling elements face away from each other.

6. Flexible coupling according to claim 2, characterized in that upset edge portions of a coupling element are supported by edge portions of the another coupling element.

7. Flexible coupling according to claim 1, characterized in that the middle parts between two apertures of two coupling elements are close together.

8. Flexible coupling according to claim 1, characterized in that the power transmitting plane of an aperture has a shape adjusted to the resilient member accommodated in the aperture.

9. Flexible coupling according to claim 1, characterized in that at least the band-shaped members of the coupling elements for transmitting power are arranged co-axially and act on the resilient members virtually tangentially according to the direction of rotation.

10. Flexible coupling according to claim 9, characterized in that the coupling elements are made of sheet steel and are provided with connecting lips and recesses fitted together.

11. Flexible coupling according to claim 1, characterized in that a band-shaped member has a plurality of bent parts, the angle between two bent parts at least 90°.

12. Flexible coupling according to claim 1, characterized in that one coupling half comprises two plate-shaped co-axially arranged coupling elements, which are connected together by means of lips and recesses.

13. Flexible coupling according to claim 12, characterized in that the coaxially arranged coupling elements are attached to one and the same coupling disc of a coupling half by means of parts arranged at some distance from each other and in that a closing strip is arranged over the resilient members.

14. Flexible coupling according to claim 13, characterized in that the closing strip comprises upset edge portions of said apertures and is also provided with recesses for accomodating lips for fixing a coupling element arranged below it.

15. Flexible coupling according to claim 14, characterized in that between the upset edge portions and closing strip and fixing lips of a coupling element a locking washer is arranged.

16. Flexible coupling according to claim 1, characterized in that a coupling half comprises one sleeve enclosing a coupling disc, to which sleeve a coupling element is attached.

17. The flexible coupling of claim 1, wherein said angle is greater than 90°.

* * * * *

UNITED STATES PATENT AND TRADEMARK OFFICE
CERTIFICATE OF CORRECTION

PATENT NO. : 3,919,860
DATED : November 18, 1975
INVENTOR(S) : H. Dolfsma

It is certified that error appears in the above-identified patent and that said Letters Patent are hereby corrected as shown below:

Column 1, line 9, after "members" insert --,--;

line 11, change "expanded" to read -- example --.

Signed and Sealed this

Twenty-sixth Day of October 1976

[SEAL]

Attest:

RUTH C. MASON
*Attesting Officer*

C. MARSHALL DANN
*Commissioner of Patents and Trademarks*